US009305381B1

(12) United States Patent
Walker et al.

(10) Patent No.: US 9,305,381 B1
(45) Date of Patent: Apr. 5, 2016

(54) MULTI-THREADED RASTERISATION

(71) Applicant: Google Inc., Mountain View, CA (US)

(72) Inventors: Adrienne Walker, San Francisco, CA (US); Nathaniel Duca, Menlo Park, CA (US)

(73) Assignee: GOOGLE INC., Mountain View, CA (US)

( * ) Notice: Subject to any disclaimer, the term of this patent is extended or adjusted under 35 U.S.C. 154(b) by 113 days.

(21) Appl. No.: 14/011,697

(22) Filed: Aug. 27, 2013

(51) Int. Cl.

| | |
|---|---|
| ***G09G 5/00*** | (2006.01) |
| ***G06T 1/00*** | (2006.01) |
| ***G06F 15/00*** | (2006.01) |
| ***G06F 9/30*** | (2006.01) |
| ***G06F 7/38*** | (2006.01) |
| ***G06T 11/20*** | (2006.01) |
| ***G06F 9/38*** | (2006.01) |
| ***G06T 15/00*** | (2011.01) |
| ***G06T 11/00*** | (2006.01) |
| ***G06T 11/60*** | (2006.01) |

(52) U.S. Cl.
CPC ............ *G06T 11/20* (2013.01); *G06F 9/30043* (2013.01); *G06F 9/3802* (2013.01); *G06F 9/3851* (2013.01); *G06T 11/001* (2013.01); *G06T 11/60* (2013.01); *G06T 15/005* (2013.01)

(58) Field of Classification Search
CPC ...... G06T 15/005; G09G 5/42; G06F 9/3867; G06F 9/3802; G06F 9/30145; G06F 3/0659; G06F 9/4843; G06F 9/4881
See application file for complete search history.

(56) References Cited

U.S. PATENT DOCUMENTS

| | | | | |
|---|---|---|---|---|
| 2011/0298787 | A1* | 12/2011 | Feies et al. | 345/419 |
| 2012/0115600 | A1* | 5/2012 | Dietrich et al. | 463/31 |
| 2013/0055072 | A1* | 2/2013 | Arnold et al. | 715/240 |
| 2013/0063459 | A1* | 3/2013 | Schneider et al. | 345/581 |

* cited by examiner

*Primary Examiner* — Phi Hoang
*Assistant Examiner* — Andrew Shin
(74) *Attorney, Agent, or Firm* — McDermott Will & Emery LLP

(57) ABSTRACT

Methods for drawing content to a display are provided. In one aspect, a method includes receiving input indicating content to be drawn to a display, and providing a request to prepare the content for display to a first thread. The method also includes receiving, in response to the provided request, instructions for drawing the content to the display, and providing the instructions for drawing the content to the display to a second thread. The method further includes executing, by the second thread, the instructions for drawing the content to the display. Systems and machine-readable media are also provided.

14 Claims, 4 Drawing Sheets

MULTI-THREADED RASTERISATION

BACKGROUND

1. Field

The present disclosure generally relates to the display of data on an electronic device, and more particularly to the use of a computing device to process data for display.

2. Description of the Related Art

Computing systems with displays commonly provide graphical displays using a compositor, which is software responsible for combining visual elements from separate sources into a single image creating an illusion that the elements are parts of a same scene. The compositor commonly runs as two threads: a compositor thread and a main thread. Threads are small sequences of programmed instructions that can be managed independently by an operating system scheduler.

The compositor thread is responsive to input from a user, such as scrolling input, and draws rasterized content (e.g., an image converted from description in a vector graphics format to a raster image) to a display that is responsive to the input. The main thread is responsible for running scripts (e.g., Javascript), layout, style recalculation, and the rasterisation of content (e.g., the task of taking an image described in a vector graphics format, such as shapes, and converting it into a raster image, such as pixels or dots, for output) to be displayed. The process of rasterisation by the main thread, however, is long and intensive, particularly for the system's central processing unit (CPU). As a result, rasterized content is often not provided to the compositor thread for display in a timely fashion, resulting in long delays when attempting to update content on a display and/or missing content from the display.

SUMMARY

According to one embodiment of the present disclosure, a computer-implemented method for drawing content to a display is provided. The method includes receiving input indicating content to be drawn to a display, and providing a request to prepare the content for display to a first thread. The method also includes receiving, in response to the provided request, instructions for drawing the content to the display, and providing the instructions for drawing the content to the display to a second thread. The method further includes executing, by the second thread, the instructions for drawing the content to the display.

According to one embodiment of the present disclosure, a system for drawing content to a display is provided. The system includes a memory that includes a first thread and a second thread, and a processor. The processor is configured to receive input indicating content to be drawn to a display. The content includes a plurality of tiles of content within or near a viewport of the display. The processor is also configured to provide a request to prepare the content for display to the first thread, and receive, in response to the provided request, instructions for drawing the content to the display. The processor is yet further configured to provide the instructions for drawing the content to the display to the second thread, and execute, by the second thread, the instructions for drawing the content to the display.

According to one embodiment of the present disclosure, a machine-readable storage medium includes machine-readable instructions for causing a processor to execute a method for drawing content to a display is provided. The method includes receiving input indicating content to be drawn to a display, and providing a request to prepare the content for display to a first thread, configured for rasterizing the content for display. The method also includes receiving, in response to the provided request, instructions for drawing the content to the display, and providing the instructions for drawing the content to the display to a second thread configured for executing instructions for rasterizing content generated by the first thread. The method further includes executing, by the second thread, the instructions for drawing the content to the display.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
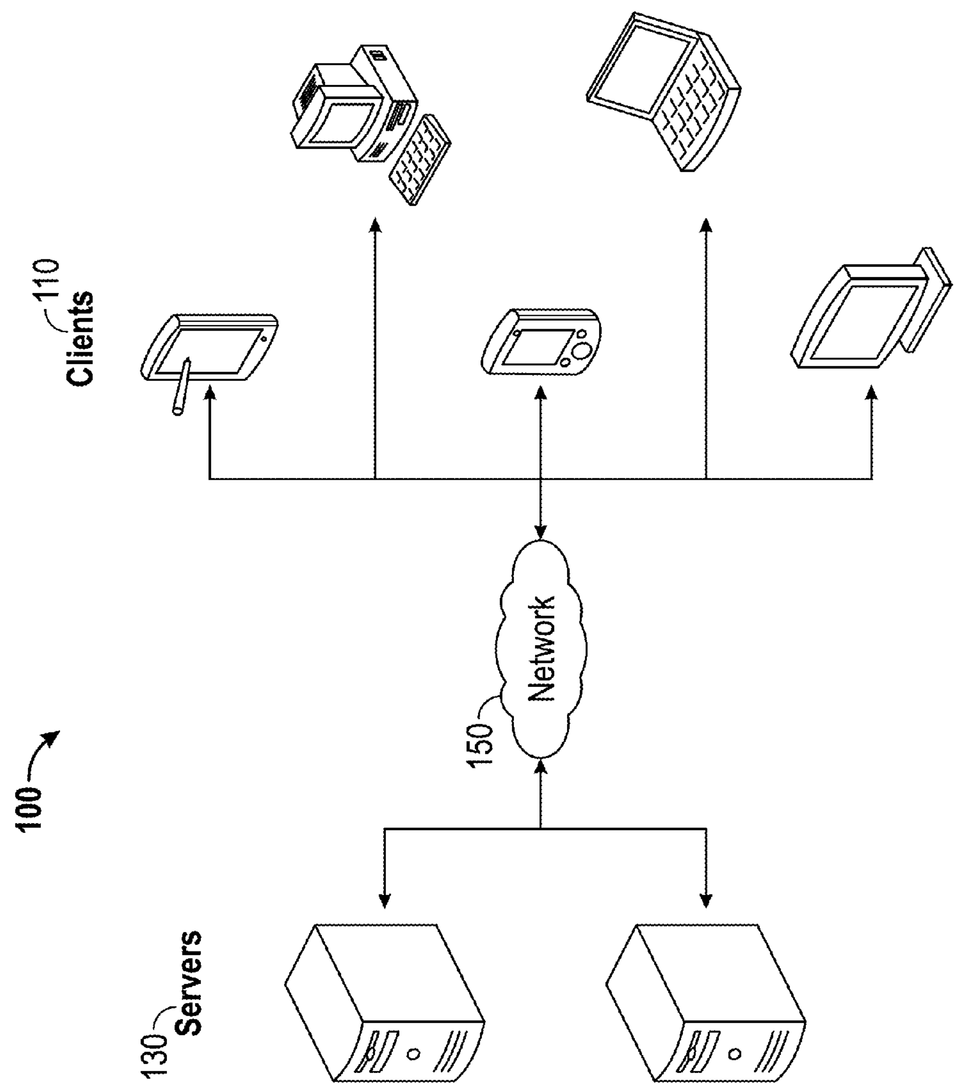
FIG. 1 illustrates an example architecture in which a device is configured to draw content to a display.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed system is configured to more efficiently use the main thread of a compositor by reducing the amount of work to be performed by the main thread. Specifically, instead of the compositor thread sending content to the main thread for rasterisation so that the main thread can provide the rasterized content for display on the graphical display, the compositor thread sends a request to the main thread to provide instructions for drawing the content to the display in a rasterized format. The compositor thread then sends the instructions received back from the main thread to one of potentially many rasterisation threads generated specifically for the execution of instructions to draw content to the display. Each rasterisation thread may be associated with a respective core of the CPU. In this manner, the responsibility of the drawing of content to the display is transferred from the main thread to the compositor thread, which then drives the rasterisation threads to draw the content. Furthermore, by moving the responsibility of rasterizing content, the compositor thread may responsively choose what and when content is rastered without, for example, being blocked on a request to the main thread that may be very latent. Additionally, the rasterisation threads may then efficiently execute the instructions for drawing content when the content is to actually be displayed, thereby deferring execution of the instructions until needed. The execution of the instructions entails, for instance, the rasterisation thread executing instructions for generating software bitmaps from a list of drawing instructions transferred originally from the main thread, and the bitmaps are then composited for display by the compositor thread. If, for example, instructions are provided to a rasterisation thread for drawing content outside of a current viewport of the display, and the user does not ever seek to display the content outside of the current viewport, then the rasterisation thread will save the processing burden of executing the instructions to display the content.

FIG. 1 illustrates an example architecture 100 architecture in which a device is configured to draw content to a display. The architecture 100 includes servers 130 and clients 110 connected over a network 150.

Each of the clients 110 is configured to display content. The content can be, for example, web pages, images, video, documents, or any other visible content. The clients 110 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities.

The clients 110 can, for example, obtain content for display from the servers 130 over a network 150. The servers 130 can be any device having an appropriate processor, memory, and communications capability for hosting content to provide to the clients 110 for display. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Each of the clients 110 includes a compositor as disclosed herein. The compositor includes a compositor thread, main thread, and one or many rasterisation threads. The compositor thread is configured to receive a request, such as from a user, to display content on the client 110. The request to display the content is then sent from the compositor thread to a main thread. The main thread generates instructions to display the content in response to the request from the compositor thread and provides the rasterizing instructions back to the compositor thread. By generating just instructions in response to the request instead of actually rasterizing the content, the CPU of the client 110 is more efficiently used and more quickly available to perform other processes. The compositor thread then provides the rasterisation instructions to one of potentially many rasterisation threads so that the rasterisation thread can execute the rasterisation instructions when the content is needed for display on the client 110. The execution of the instructions entails, for instance, the rasterisation thread executing instructions for generating software bitmaps from a list of drawing instructions transferred originally from the main thread, and the bitmaps are then composited for display by the compositor thread. In certain aspects, there may be as many rasterisation threads as there are cores of the CPU of the client 110.

Figure 2:
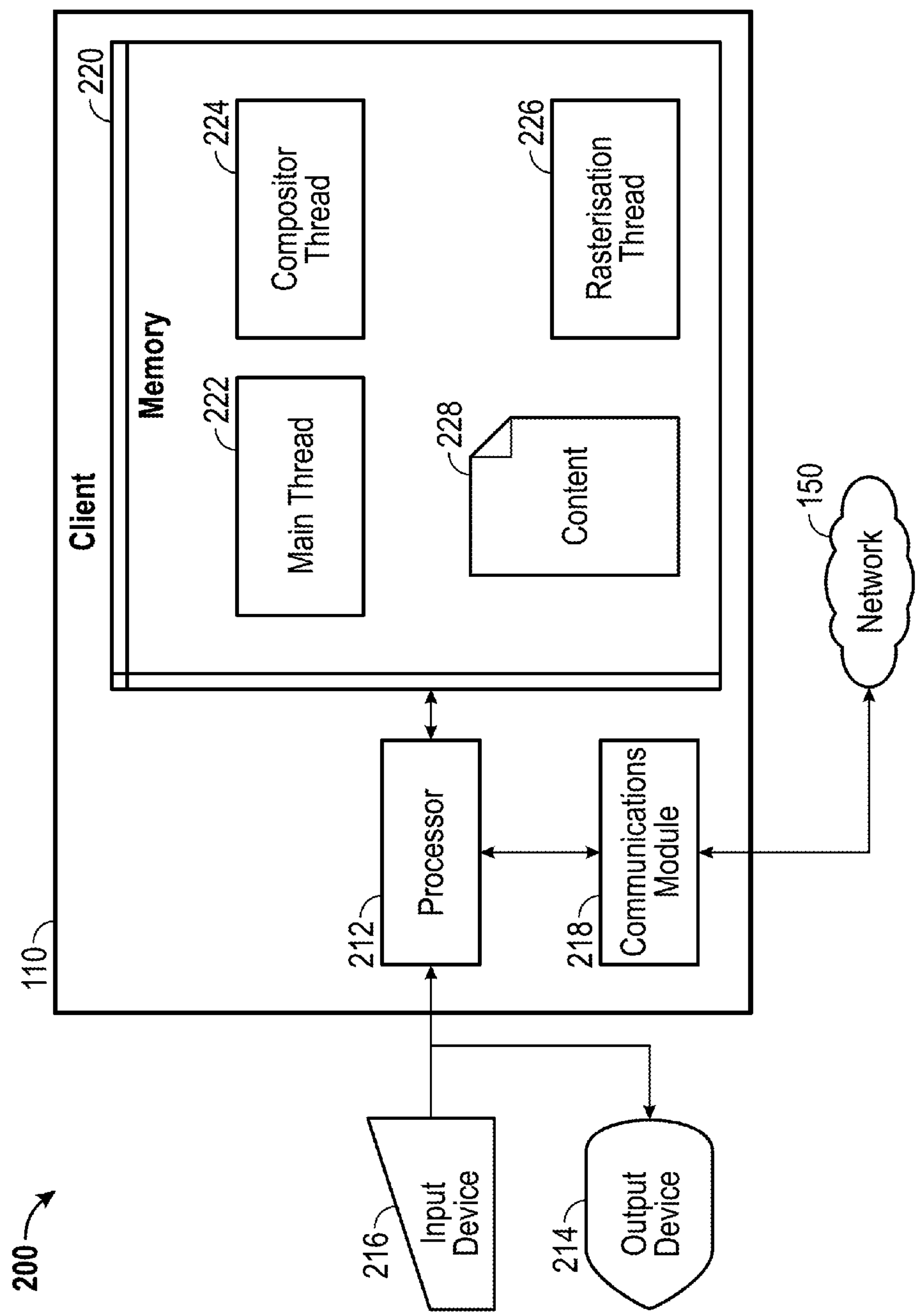
FIG. 2 is a block diagram illustrating an example client from the architecture of FIG. 1 according to certain aspects of the disclosure.

FIG. 2 is a block diagram 200 illustrating an example client 110 in the architecture 100 of FIG. 1 according to certain aspects of the disclosure. Although not illustrated, the client 110 can be connected to one or many servers 130 over the network 150 in order to download content for display.

The client 110 includes a processor 212, a communications module 218 (e.g., for connecting to the network 150), and a memory 220. The memory 220 of the client 110 includes a main (or "first") thread 222, at least one rasterisation (or "second") thread 226, and a compositor (or "third") thread 224.

The compositor thread 224 is commonly configured for compositing content for display on an output device 214. In other words, the compositor thread 224 is the thread that is used by the processor 212 to perform compositing. The compositor thread 224 may also be referred to as an "impl" thread because the compositor thread 224 is responsible for the implementation of compositing content.

The main thread 222 is commonly configured for rasterizing content for display on the output device 214 in response to a request from the compositor thread 224. The main thread 222 may also be referred to as a "WebKit" or other layout engine software component thread. The main thread 222 includes a primary (or "active") version of a hierarchy of layer of content to be rasterized. In certain aspects, the main thread 222 is a typical layer tree. The layer has transformation, size, and content. On the other hand, the compositor thread 224 may be hidden from users of the layer tree of the main thread 222. The compositor thread 224 may include a copy of the version (or "pending version") of the hierarchy of layer of content 228 to be rasterized.

The tree of the main thread 222 may be a model of what the layout engine software component (e.g., WebKit) intends to draw. The main thread 222 may paint layer contents into textures, which are then handed to the tree of the compositor thread 224. The tree of the compositor thread 224 is actually what gets drawn to the output device 214.

The memory 220 also includes content 228 for display on the output device 214, which can be a display. The content 228 can include one or many tiles of content within or near a viewport of the display. For instance, the content 228 can be subdivided (or "tiled") by a regular grid in image space to exploit local spatial coherence in the content 228 and/or to facilitate the use of limited hardware rendering resources of the client 110 later in the graphics pipeline. The client 110 may also include an input device 216, such as a keyboard or mouse, for receiving a request from a user to display the content 228 on the output device 214.

The processor 212 of the client 110 is configured to execute instructions, such as instructions physically coded into the processor 212, instructions received from software in memory 240, or a combination of both, for drawing the content 228 to the output device 214. For example, the processor 212 of the client 110 executes instructions to receive input indicating the content 228 to be drawn to a display (e.g., the output device 214). The input indicating the content 228 to be drawn to the display is received by the compositor thread 224, and thus the instructions provided to the processor 212 to receive the input may be generated by the compositor thread 224.

The processor 212 is also configured (e.g., by the compositor thread 224) to provide, to the main thread 222, a request to prepare the content 224 for display (e.g., on the output device 214). The request to prepare the content 224 for display can include a request to rasterize the content 224. In other words, the request is to convert the content 224 from description in a vector graphics format to a raster image by providing instructions for doing so. Instead of rasterizing the content 224, however, the processor 212 is configured by the main thread to generate the instructions for drawing (i.e., instructions for how to rasterize, but not actually rasterize) the content 224. The processor 212 as instructed by the main thread 222 then provides the instructions for drawing the content 224 to the compositor thread 224, which is configured to receive the instructions for drawing the content to the output device 214 in response to the provided request.

The processor 212 of the client 110 is further configured by the compositor thread 224 to provide the instructions for drawing the content to the display to a rasterisation thread 226. Although one rasterisation thread 226 is illustrated in the block diagram 200, in certain aspects there may be many rasterisation threads 226 configured to execute instructions for drawing content to the output device 214. Each of the many rasterisation threads 226 can be associated with a distinct core of the processor 212.

The rasterisation thread 226 is configured to instruct the processor 212 to execute the instructions for drawing the content 228 to the output device 214. The execution of the instructions entails, for instance, the rasterisation thread executing instructions for generating software bitmaps from a list of drawing instructions transferred originally from the main thread 222, and the bitmaps are then composited for display by the compositor thread 224. The instructions are generated by the main thread 222 for rasterizing the content 228. As such, the rasterisation thread 226, not the main thread 222, is responsible for drawing the content 228 to the output device 214. Accordingly, the rasterisation thread 226 can advantageously execute the instructions only when needed. For example, the rasterisation thread 226 can configure the processor 212 to defer execution of the instructions for drawing the content 228 to the output device 214 until another input is received indicating the content has been requested for display. In other words, if and when a user of the client 110 requests the content 228 to be displayed (e.g., by scrolling a web page), the rasterisation thread 226 will then instruct the processor 212 to draw the content 228 to the output device. This may be advantageous where, for example, the content 228 may be batched for the same images, thereby improving image decode cache usage. This also permits for the analysis of the content 228 that has been deferred from display in order to identify, for example, sublayer rectangles that are solid colors and drawing them more efficiently.

In certain aspects, the instructions for drawing the content 228 can be buffered or optionally double-buffered so that instructions for other (e.g., an older frame) content can be rasterized in parallel with the content 228 (e.g., for a new frame) in case where, for example, a user scrolls and content is needed quickly for display on the output device 214. In certain aspects, instructions for different content (e.g., older versus newer content) can be prioritized using a centralized manager so that the most appropriate content can be rasterized.

Figure 3:
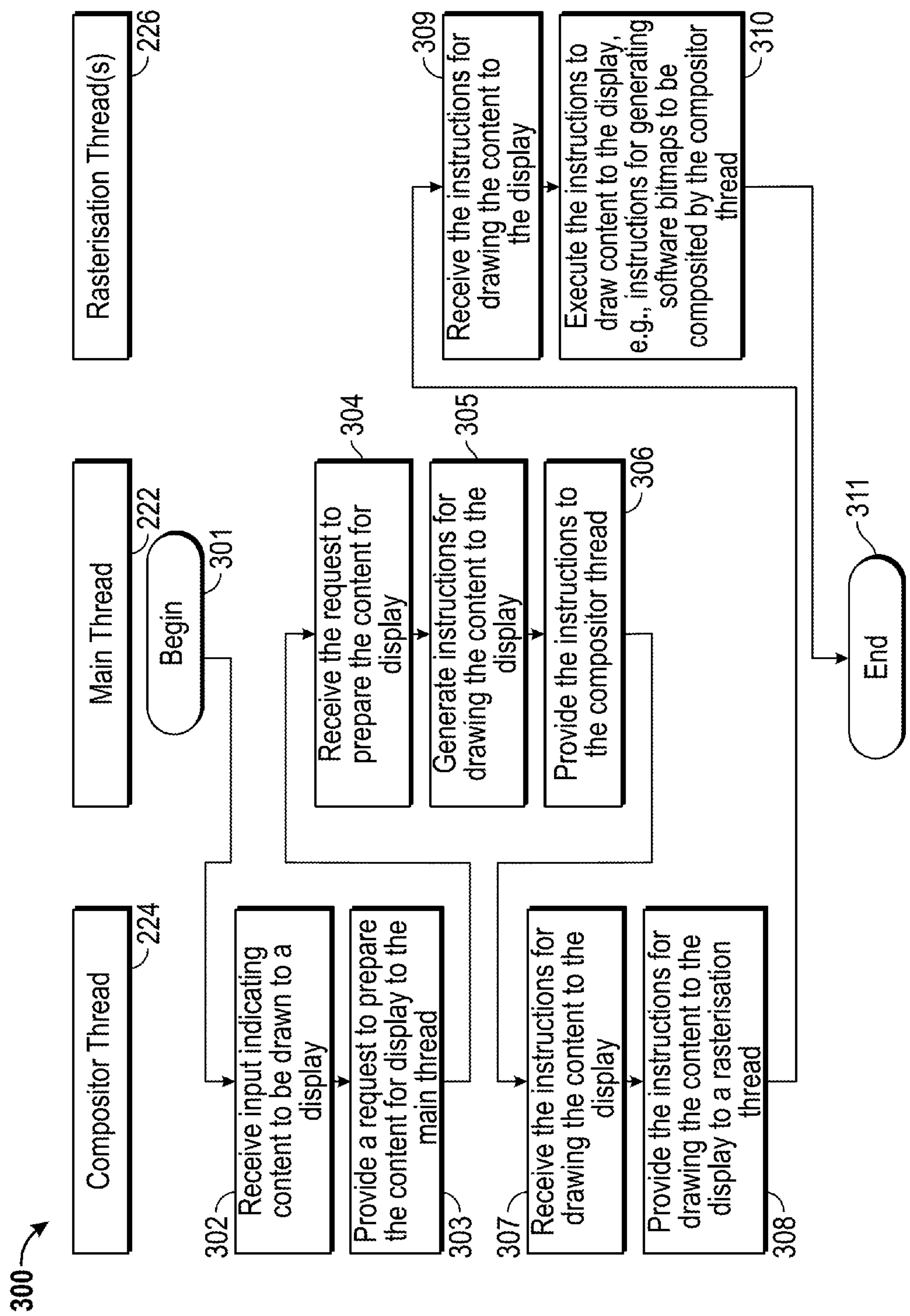
FIG. 3 illustrates an example process for drawing content to a display using the example client of FIG. 2.

FIG. 3 illustrates an example process 300 for drawing content to a display using the example client 110 of FIG. 2. While FIG. 3 is described with reference to FIG. 2, it should be noted that the process steps of FIG. 3 may be performed by other systems.

The process 300 begins by proceeding from beginning step 301 when an application configured for displaying the content 228 using a compositor thread 224, main thread 222, and rasterisation thread 226 is loaded to step 302 where the compositor thread 224 receives input indicating the content 228 to be drawn to the display (e.g., output device 214). The request can be, for example, a request from a user to load a web page for display in the application. Next, in step 303, the compositor thread 224 provides a request to prepare the content 228 for display to the main thread 222.

Turning to the main thread 222, in step 304 the main thread 222 receives the request to prepare the content 228 for display and in step 305 the main thread 222 generates instructions for drawing the content 228 to the display (e.g., on the output device 214). Next, in step 306, the main thread 222 provides the instructions to the compositor thread 224.

Turning to the compositor thread 224, in step 307 the compositor thread 224 receives the instructions for drawing the content 228 to the display from the main thread 222. In step 308, the compositor thread 224 provides the instructions for drawing the content 228 to the display to the rasterisation thread 226.

Now turning to the rasterisation thread 226, the rasterisation thread 226 in step 309 receives the instructions for drawing the content 228 to the display. In step 310, the rasterisation thread 226 executes the instructions to draw the content to the display. The execution of the instructions entails, for instance, the rasterisation thread executing instructions for generating software bitmaps from a list of drawing instructions transferred originally from the main thread, and the bitmaps are then composited for display by the compositor thread. Using the above example, the instructions may be executed when, for example, the user scrolls the web page such that the content 228 for the portion of the web page enters the viewport of the output device 214 of the client. The process 300 then ends in step 311.

Figure 4:
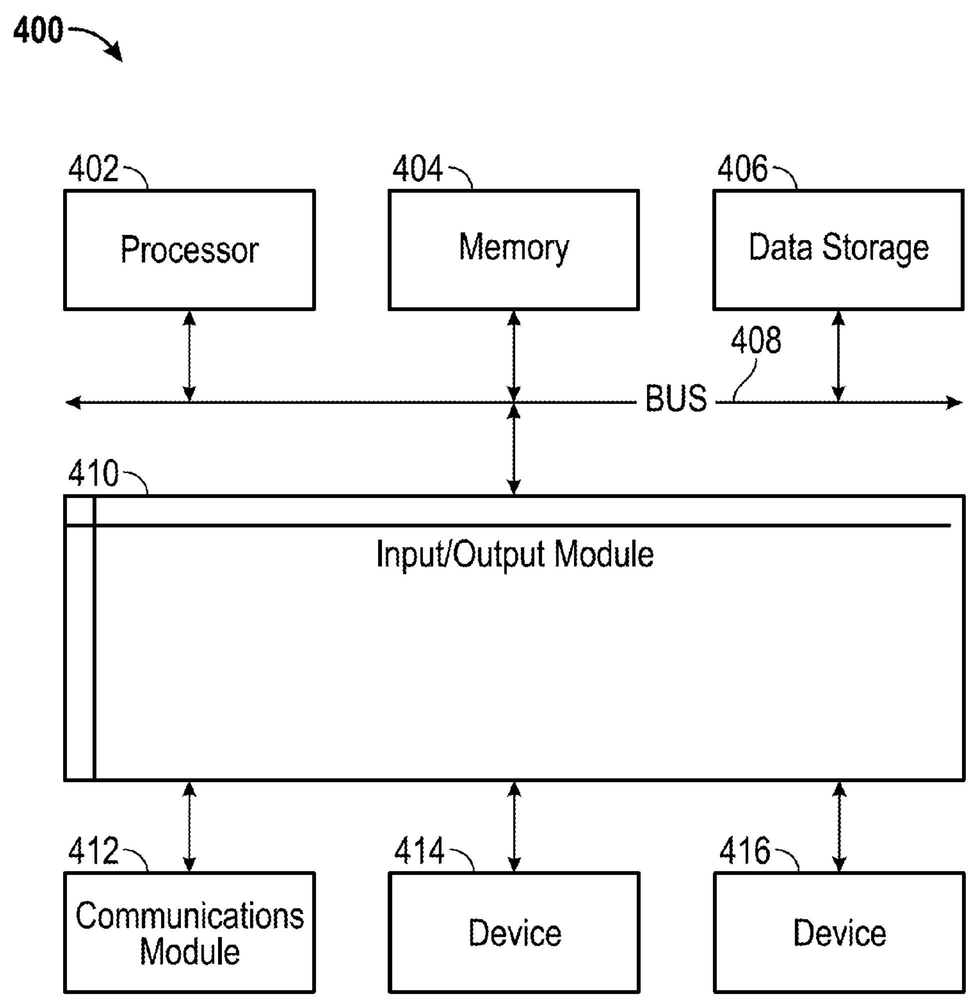
FIG. 4 is a block diagram illustrating an example computer system with which the client of FIG. 2 can be implemented.

FIG. 4 is a block diagram illustrating an example computer system 400 with which the client 110 of FIG. 2 can be implemented. In certain aspects, the computer system 400 may be implemented using hardware or a combination of software and hardware, either in a dedicated server, or integrated into another entity, or distributed across multiple entities.

Computer system 400 (e.g., clients 110) includes a bus 408 or other communication mechanism for communicating information, and a processor 402 (e.g., processor 212) coupled with bus 408 for processing information. By way of example, the computer system 400 may be implemented with one or more processors 402. Processor 402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 400 can include, in addition to hardware, code that creates an execution environment for the computer program in question, e.g., code that constitutes processor firmware, a protocol stack, a database management system, an operating system, or a combination of one or more of them stored in an included memory 404 (e.g., memory 220) such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, special purpose logic circuitry.

The instructions may be stored in the memory 404 and implemented in one or more computer program products, i.e., one or more modules of computer program instructions encoded on a computer readable medium for execution by, or to control the operation of, the computer system 400, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 404 may also be used for storing temporary variable or other intermediate information during execution of instructions to be executed by processor 402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. Computer system 400 may be coupled via input/output module 410 to various devices. The input/output module 410 can be any input/output module. Example input/output modules 410 include data ports such as USB ports. The input/output module 410 is configured to connect to a communications module 412. Example communications modules 412 (e.g., communications module 218) include networking interface cards, such as Ethernet cards and modems. In certain aspects, the input/output module 410 is configured to connect to a plurality of devices, such as an input device 414 (e.g., input device 216) and/or an output device 416 (e.g., output device 214). Example input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 416 include display devices, such as a LED (light emitting diode), CRT (cathode ray tube), or LCD (liquid crystal display) screen, for displaying information to the user.

According to one aspect of the present disclosure, the client 110 can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in main memory 404 causes processor 402 to perform the process steps described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, a desktop computer, laptop computer, or tablet computer. Computer system 400 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 402 for execution. Such a medium may take many forms, including, but not limited to, non-volatile media, volatile media, and transmission media. Non-volatile media include, for example, optical disks, magnetic disks, or flash memory, such as data storage device 406. Volatile media include dynamic memory, such as memory 404. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for drawing content to a display, the method comprising:

receiving, by a third thread, input indicating the content to be drawn to the display, wherein the third thread is configured to request and receive drawing instructions for drawing the content from a first thread and provide the drawing instructions to a second thread;

providing, by the third thread to the first thread configured to provide the drawing instructions for drawing the content to the display, a request to prepare the content for display;

receiving, by the third thread from the first thread and in response to the provided request, the drawing instructions for drawing the content to the display;

providing, to the second thread, the drawing instructions for drawing the content to the display; and executing, by the second thread, rasterisation instructions based on the drawings instructions provided by the first thread for drawing the content to the display, wherein the rasterization instructions comprise instructions for generating software bitmaps of the content from the drawing instructions provided by the first thread, and instructions for compositing the software bitmaps for display, and wherein the executing the rasterisation instructions for drawing the content to the display by the second thread is deferred until a user input is received indicating the content has been requested for display.

2. The method of claim 1, wherein the request to prepare the content for display comprises a request to rasterize the content.

3. The method of claim 1, wherein the second thread is among a plurality of rasterisation threads configured to execute rasterisation instructions based on the drawings instructions provided by the first thread for drawing content to the display.

4. The method of claim 3, wherein each of the plurality of rasterisation threads is associated with a distinct central processing unit (CPU) core.

5. The method of claim 1, wherein the first thread is configured to generate the instructions for drawing the content using a central processing unit (CPU).

6. The method of claim 1, wherein the first thread is configured for rasterizing the content for display.

7. The method of claim 1, wherein the content to be drawn to the display comprises a plurality of tiles of content within or near a viewport of the display.

8. A system for drawing content to a display, the system comprising:

a memory comprising a first thread, a second thread, and a third thread, wherein the third thread configured to request and receive drawing instructions for drawing the content from the first thread and provide the drawing instructions to the second thread; and a processor configured to:

receive, by the third thread, input indicating the content to be drawn to the display, the content comprising a plurality of tiles of content within or near a viewport of the display;

provide, by the third thread to the first thread configured to provide the drawing instructions for drawing the content to the display, a request to prepare the content to the display;

receive, by the third thread from the first thread and in response to the provided request, the drawing instructions for drawing the content to the display;

provide, to the second thread, the drawing instructions for drawing the content to the display; and execute, by the second thread, rasterization instructions based on the drawings instructions provided by the first thread for drawing the content to the display, wherein the rasterisation instructions comprise instructions for generating software bitmaps of the content from the drawing instructions provided by first thread, and instructions for compositing the software bitmaps for display, and wherein the execution of the rasterisation instructions for drawing the content to the display by the second thread is deferred until a user input is received indicating the content has been requested for display.

9. The system of claim 8, wherein the request to prepare the content for display comprises a request to rasterize the content.

10. The system of claim 8, wherein the second thread is among a plurality of rasterisation threads in the memory configured to execute rasterisation instructions based on the drawings instructions provided by the first thread for drawing content to the display.

11. The system of claim 10, wherein each of the plurality of rasterisation threads is associated with a distinct central processing unit (CPU) core of the system.

12. The system of claim 8, wherein the first thread is configured to generate the instructions for drawing the content using a central processing unit (CPU).

13. The system of claim 8, wherein the first thread is configured for rasterizing the content for display.

14. A non-transitory machine-readable storage medium comprising machine-readable instructions for causing a processor to execute a method for drawing content to a display, the method comprising:

receiving, by a third thread, input indicating the content to be drawn to the display, wherein the third thread is configured to request and receive drawing instructions for drawing the content from a first thread and provide the drawing instructions to a second thread;

providing, by the third thread to the first thread configured to provide the drawing instructions for drawing the content to the display, a request to prepare the content for display;

receiving, by the third thread from the first thread and in response to the provided request, the drawing instructions for drawing the content to the display;

providing, from the third thread to the second thread, the drawing instructions for drawing the content to the display; and executing, by the second thread, rasterisation instructions based on the drawings instructions provided by the first thread for drawing the content to the display, wherein the rasterization instructions comprise instructions for generating software bitmaps of the content from the drawing instructions provided by the first thread, and instructions for compositing the software bitmaps for display, and wherein the executing the rasterisation instructions for drawing the content to the display by the second thread is deferred until a user input is received indicating content has been requested for display.

* * * * *